(12) United States Patent
Seo et al.

(10) Patent No.: US 8,867,590 B2
(45) Date of Patent: Oct. 21, 2014

(54) METHOD AND APPARATUS FOR RELAYING SIGNAL IN WIRELESS NETWORK

(75) Inventors: Han Byul Seo, Anyang-si (KR); Daeyoung Park, Incheon (KR); Byoung Hoon Kim, Anyang-si (KR)

(73) Assignees: LG Electronics Inc., Seoul (KR); Inha Industry Partnership Institute, Incheon (KR)

( * ) Notice: Subject to any disclaimer, the term of this patent is extended or adjusted under 35 U.S.C. 154(b) by 228 days.

(21) Appl. No.: 13/636,620

(22) PCT Filed: Mar. 10, 2011

(86) PCT No.: PCT/KR2011/001671
§ 371 (c)(1),
(2), (4) Date: Sep. 21, 2012

(87) PCT Pub. No.: WO2011/118926
PCT Pub. Date: Sep. 29, 2011

(65) Prior Publication Data
US 2013/0010841 A1    Jan. 10, 2013

Related U.S. Application Data

(60) Provisional application No. 61/315,975, filed on Mar. 21, 2010.

(30) Foreign Application Priority Data

Jul. 12, 2010   (KR) .................. 10-2010-0066871

(51) Int. Cl.
H04L 1/02       (2006.01)
H04B 7/02       (2006.01)
H04B 7/155      (2006.01)
H04L 25/03      (2006.01)
H04L 25/02      (2006.01)
H04L 5/00       (2006.01)
H04W 84/18      (2009.01)
H04B 7/04       (2006.01)

(52) U.S. Cl.
CPC .......... *H04B 7/155* (2013.01); *H04L 25/03891* (2013.01); *H04L 25/0204* (2013.01); *H04L 5/0023* (2013.01); *H04W 84/18* (2013.01); *H04B 7/0413* (2013.01); *H04B 7/15521* (2013.01)
USPC ........... 375/214; 375/219; 375/220; 375/267; 375/299; 375/347; 370/334; 455/101

(58) Field of Classification Search
USPC ................. 375/214, 219, 220, 267, 299, 347; 370/334; 455/101
See application file for complete search history.

(56) References Cited

U.S. PATENT DOCUMENTS

| 7,583,747 B1* | 9/2009 | Damen et al. ............... 375/267 |
| 2007/0201632 A1* | 8/2007 | Ionescu ..................... 379/88.01 |
| 2011/0149835 A1* | 6/2011 | Shimada et al. ............. 370/315 |

FOREIGN PATENT DOCUMENTS

WO    WO 2009107314 A1    9/2009

OTHER PUBLICATIONS

Vaze et al., "Optimal Amplify and Forward Strategy for Two-Way Relay Channel with Multiple Relays," ITW 2009, Jun. 10-12, 2009, Volos, Greece, pp. 181-185.

Yammine et al., "Performance of SP(n) Codes in Two-Way Wireless Relay Networks," 2009 International ITG Workshop on Smart Antennas, WSA, Feb. 16-18, 2009, Berlin, Germany, 7 pages.

\* cited by examiner

*Primary Examiner* — Ted Wang
(74) *Attorney, Agent, or Firm* — Birch, Stewart, Kolasch & Birch, LLP

(57) ABSTRACT

Disclosed are a control method and a control device for implementing two-way communication in a wireless network. A repeater can measure a channel matrix, which indicates channel information of each of a plurality of nodes based on signals received simultaneously from the plurality of the nodes, and calculate a first basic lattice size, which initializes the lattice sizes of the received signals according to predefined rules. Then, the repeater uses the channel matrix of each of the nodes and the initialized first lattice size to calculate for each of the nodes a first normalization factor, which normalizes the sizes of the signals simultaneously received from each of the nodes, and a minimum normalized factor, which is equivalent to the minimum value of the first normalization factor. And then, the repeater calculates a second lattice size for each of the nodes using the first normalization factor, the minimum normalization factor, and the initialized first lattice size, which have been calculated for each of the nodes. Then, the repeater calculates a second normalization factor using the second lattice size and the channel matrix of each of the nodes. And then, the repeater transmits the new calculated lattice size and the normalization factor to each of the nodes.

18 Claims, 10 Drawing Sheets

(a) : 2 antennas (b) : 3 antennas

METHOD AND APPARATUS FOR RELAYING SIGNAL IN WIRELESS NETWORK

CROSS REFERENCE TO RELATED APPLICATIONS

This application is the National Phase of PCT/KR2011/001671 filed on Mar. 10, 2011, which claims priority under 35 U.S.C. 119(e) to U.S. Provisional Application No. 61/315,975 filed on Mar. 21, 2010, and under 35 U.S.C. 119(a) to Patent Application No. 10-2010-0066871 filed in Republic of Korea on Jul. 12, 2010, all of which are hereby expressly incorporated by reference into the present application.

TECHNICAL FIELD

The present invention relates to a mobile communication system and more particularly to a method and apparatus for relaying signals in two ways.

BACKGROUND ART

When a channel between a base station or eNode B and a terminal or user equipment (UE) is in a bad condition in a wireless network, a Relay Node (RN) may be installed between the eNode B and the UE to provide a radio channel with higher quality to the UE. In addition, an RN may be used in a cell edge area in which a channel from an eNode B is in a bad condition to provide a high-speed data channel and to extend the cell service area. Thus, RNs are being widely used in wireless communication systems for eliminating blind zones.

While the conventional relay schemes are limited to the repeater function that simply amplifies and transmits signals, more intelligent relay schemes have recently been developed. Relay technology is essential to increase service coverage and data throughput while reducing the costs of extensive installation of eNode Bs and the costs of backhaul network maintenance in next-generation mobile communication systems. As relay technology gradually develops, new wireless communication systems need to support RNs used in conventional wireless communication systems.

Conventional RNs have limitations in sufficiently supporting two-way communication services. However, studies have not been conducted on a control method for an RN to simultaneously receive signals in two ways and to simultaneously transmit signals in two ways.

DISCLOSURE

Technical Problem

An object of the present invention is to provide a control method for a relay to perform two-way communication.

Another object of the present invention is to provide a relay that performs a control method for a relay to perform two-way communication.

Another object of the present invention is to provide a method for a node to transmit a signal in a wireless network in which a two-way relay is present.

Another object of the present invention is to provide a node for transmitting a signal in a wireless network in which a two-way relay is present.

Objects of the present invention are not limited to those described above and other objects will be clearly understood by a person having ordinary knowledge in the art from the following description.

Technical Solution

A method for relaying signals simultaneously received from a plurality of nodes in a mobile communication system according to the present invention for achieving the objects may include simultaneously receiving signals from a plurality of nodes, calculating a lattice size value of a signal that each of the plurality of nodes is to transmit through each antenna and a normalization factor value for normalizing a magnitude of the signal that each of the plurality of nodes is to transmit based on the signals simultaneously received from the plurality of nodes, and transmitting the calculated lattice size value and normalization factor value to each of the plurality of nodes.

Calculating the lattice size value and the normalization factor value may further include calculating an initialized first basic lattice size value as the lattice size value of the signal according to a predefined rule, calculating, for each of the nodes, a first normalization factor value for normalizing magnitudes of signals simultaneously received from the nodes and a minimum normalization factor value corresponding to a minimum of the first normalization factor value using the first basic lattice size value and channel information of each of the nodes, calculating a second lattice size of each of the nodes using the first normalization factor value, the minimum normalization factor value, and the first basic lattice size calculated for each of the nodes, and calculating a second normalization factor value using the second lattice size value and channel information of each of the nodes, wherein the lattice size value and the normalization factor value transmitted to each of the nodes are the second lattice size value and the second normalization factor value.

A relay according to the present invention for achieving the objects may include a reception module for simultaneously receiving signals from a plurality of nodes, a processor for calculating a lattice size value of a signal that each of the plurality of nodes is to transmit through each antenna and a normalization factor value for normalizing a magnitude of the signal that each of the plurality of nodes is to transmit based on the signals simultaneously received from the plurality of nodes, and a transmission module for transmitting the calculated lattice size value and normalization factor value to each of the plurality of nodes.

The processor may include a first processor for calculating an initialized first basic lattice size value as the lattice size value of the signal according to a predefined rule, a second processor for calculating, for each of the nodes, a first normalization factor value for normalizing magnitudes of signals simultaneously received from the nodes and a minimum normalization factor value corresponding to a minimum of the first normalization factor value using the first basic lattice size and channel information of each of the nodes, a third processor for calculating a second lattice size value of each of the nodes using the first normalization factor value, the minimum normalization factor value, and the first basic lattice size value calculated for each of the nodes, and a fourth processor for calculating a second normalization factor value using the second lattice size value and channel information of each of the nodes, wherein the lattice size value and the normalization factor value transmitted from the transmission module to each of the nodes are the second lattice size value and the second normalization factor value.

A method for transmitting a signal from a node in a mobile communication system according to the present invention for achieving the objects may receiving, from a relay, a lattice size value and a normalization factor value for normalizing a magnitude of a transmission signal of the node, applying precoding to a channel-coded and modulated signal using the received lattice size value and normalization factor value, and transmitting the precoded signal after modulation to the relay through each antenna.

A method for transmitting a signal from a node in a mobile communication system according to the present invention for achieving the objects may include receiving, from a relay, a lattice size value of a signal that is to be transmitted through each antenna and a normalization factor value for normalizing a magnitude of a signal that the node is to transmit, performing precoding on a channel-coded signal using the received lattice size value and normalization factor value, and transmitting the precoded signal to the relay through each antenna.

A node for transmitting a signal in a mobile communication system according to the present invention for achieving the objects may include a reception module for receiving, from a relay, a lattice size value of a signal that is to be transmitted through each antenna and a normalization factor value for normalizing a magnitude of a signal that the node is to transmit, a processor for performing precoding on a channel-coded signal using the received lattice size value and normalization factor value, and a transmission module for transmitting the precoded signal to the relay through each antenna.

Advantageous Effects

According to the present invention, in a two-way wireless RN network which uses multiple antennas, the relay simultaneously detects signals received from both nodes and transmits the signals to the nodes, thereby achieving an advantage in that transmission time is reduced.

Advantages of the present invention are not limited to those described above and other advantages will be clearly understood by a person having ordinary knowledge in the art from the following description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the mobile communication system is a 3GPP LTE system, the following descriptions, except descriptions specific to 3GPP LTE, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "User Equipment (UE)" is used to generally describe any mobile or stationary user device such as a Mobile Station (MS), an Advanced Mobile Station (AMS), or a mobile terminal. In addition, the term "eNode B (eNB)" is used to generally describe any network node that communicates with the UE such as a Node B, a base station, or an Access Point (AP).

In a mobile communication system, a UE can receive information from an eNode B through downlink and can transmit information to an eNode B through uplink. Information transmitted or received by the UE includes data and various control information and various physical channels are present according to the type or usage of information transmitted or received by the UE.

Figure 1:
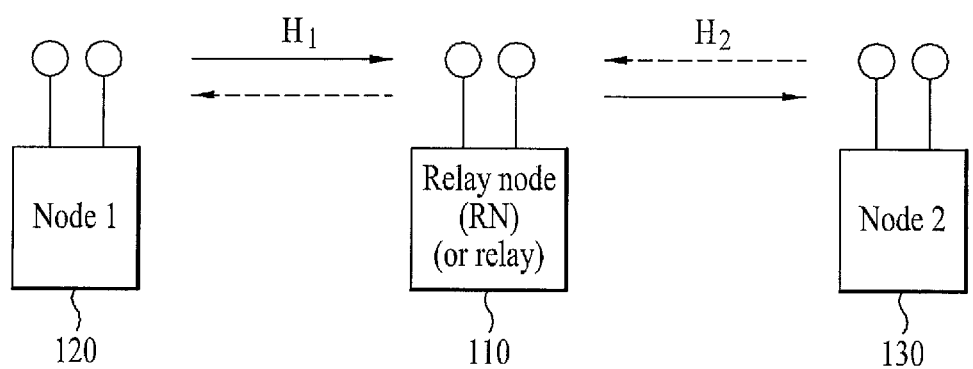
FIG. 1 illustrates an exemplary network system in which a wireless Relay Node (RN) is present between 2 nodes.

FIG. 1 illustrates an exemplary network system in which a wireless Relay Node (RN) is present between 2 nodes.

As shown in FIG. 1, an RN 110 (or relay) may be present between 2 nodes (i.e., node 1 (120) and node 2 (130)). For example, in the case of a cellular system, one of the node 1 (120) and the node 2 (130) may be an eNode B and the other may be a UE. That is, a specific node other than the RN may be a UE or an eNode B. The node 1 (120) and the node 2 (130) may transmit a signal or data to each other through the RN 110.

Figure 2:
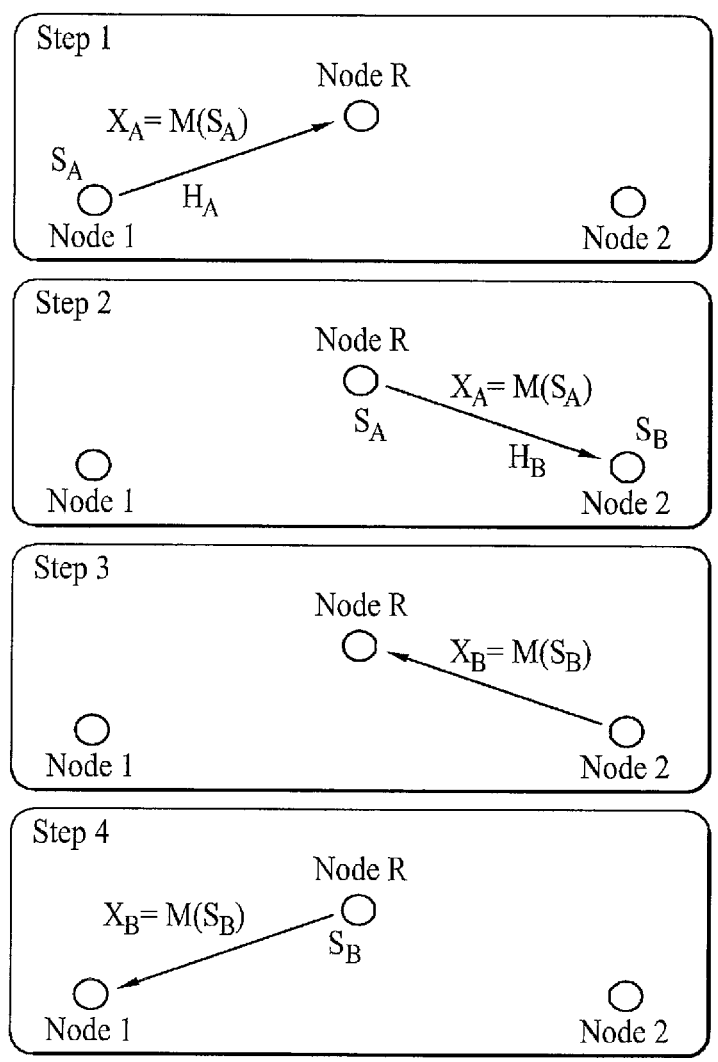
FIGS. 2 to 4 illustrate exemplary operations of two-way RNs of respective radio networks.
Figure 3:
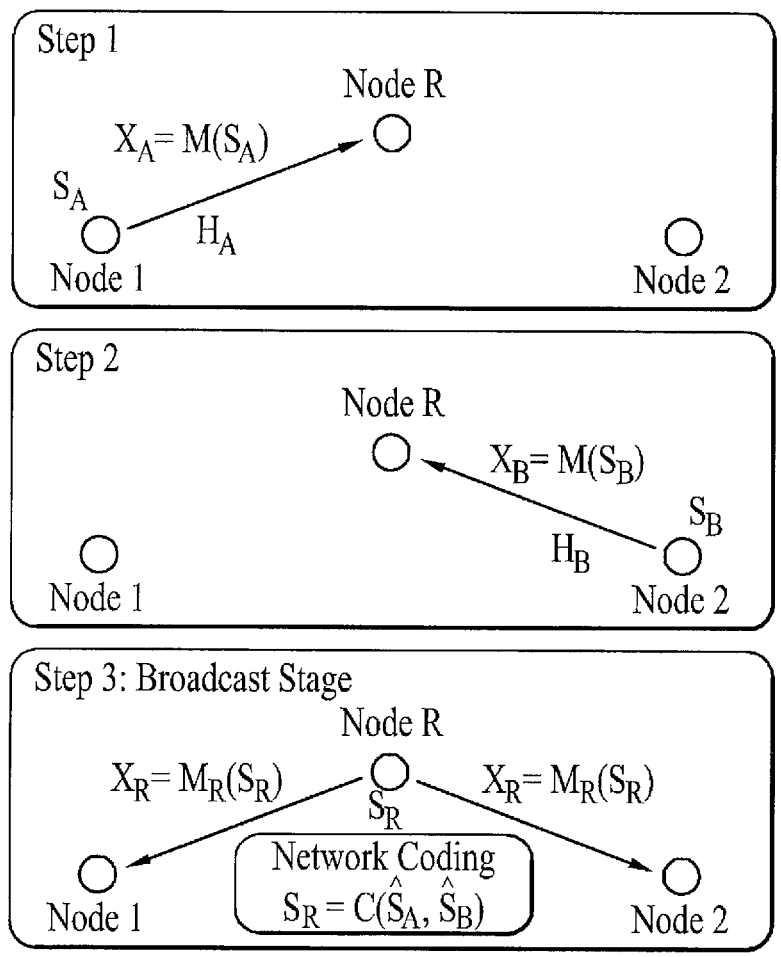
Figure 4:
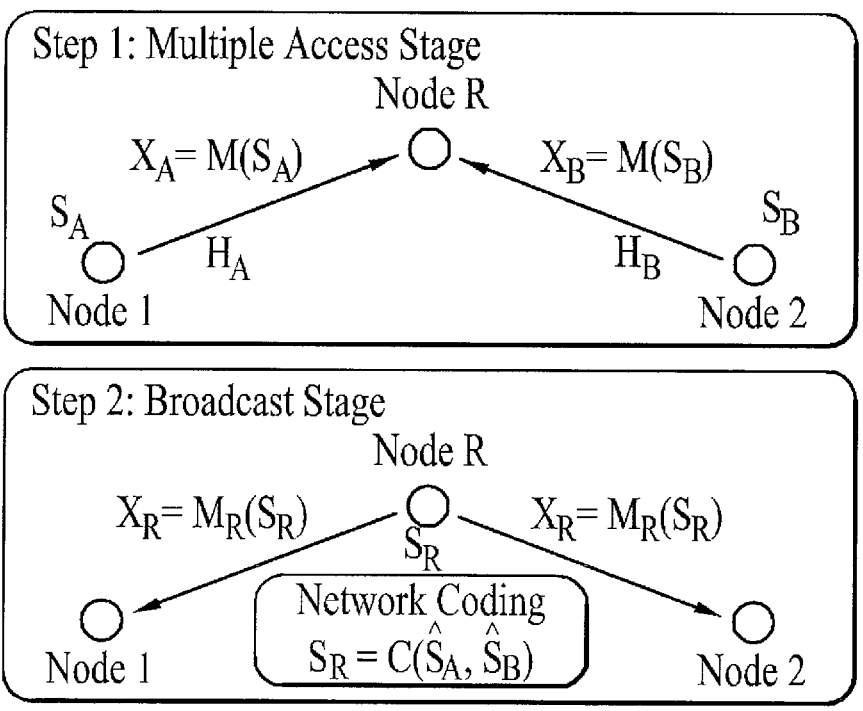

FIGS. 2 to 4 illustrate exemplary operations of two-way RNs of respective radio networks.

As shown in FIG. 2, both nodes (node 1 and node 2) may transmit and receive signals in 4 steps. Specifically, the 4 steps include step 1 in which node 1 transmits a signal to an RN (node R), step 2 in which the RN transmits the signal received from node 1 to node 2, step 3 in which the RN receives a signal from node 2, and step 4 in which the RN transmits the signal received from node 2 to node 1. In this manner, the two-way RN, which executes such 4 steps, can use the conventional transmission and reception schemes without change.

Unlike the RN of FIG. 2, an RN shown in FIG. 3 may receive signals from two nodes (node 1 and node 2) in 2 steps and transmit a signal to the two nodes at once such that the RN may transmit and receive signals in a total of 3 steps. That is, the RN may appropriately combine and network-code signals received from the two nodes and transmit the resulting signal to the two nodes at once. In most radio networks, information is delivered through routing which serves only to deliver information received through an input link of each node to an output link. However, network coding includes delivery, appropriate combination, and the like of input information at a network node. Thereafter, the node 1 (or node 2) may detect the signal that the node 2 (or node 1) has transmitted by removing the signal transmitted by the node 1 (or node 2) from the signal received from the RN. Such network coding may be performed through bitwise XOR (exclusive OR).

Referring to FIG. 4, node 1 and node 2 may simultaneously transmit signals to the RN. The RN may then perform network coding on the signals simultaneously received from node 1 and node 2 and simultaneously transmit resulting signals to node 1 and node 2. Such 2-step relaying in this manner reduces the time required to exchange signals, compared to 4-step relaying and 3-step relaying of FIGS. 2 and 3, thereby achieving a higher transfer rate. However, the procedure for simultaneously receiving and processing signals in the RN may be complicated.

Conventional 2-step two-way relaying is generally applied to the case in which the number of antennas mounted on the RN is equal to or greater than the number of antennas of each of the nodes (node 1 and node 2). The reason for this is that a greater number of antennas mounted on the RN is more advantageous when the RN detects signals of both nodes between the nodes or detects a signal into which the signals have been combined (for example through XOR operation). However, in the cellular mobile communication system, the number of antennas mounted on an eNode B is equal to or greater than the number of antennas mounted on an RN. The following is a description of a transmission scheme that is applied to the case in which, as with the number of antennas mounted on an eNode B, the number of antennas mounted on one node is equal to or greater than the number of antennas mounted on an RN.

Figure 5:
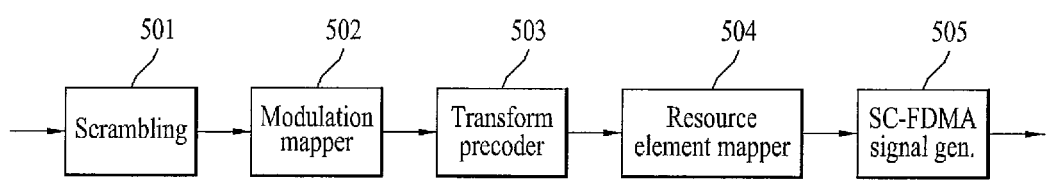
FIG. 5 illustrates a signal processing procedure for a specific node in a wireless network to transmit an uplink signal when the specific node is a UE.

FIG. 5 illustrates a signal processing procedure for a specific node in a wireless network to transmit an uplink signal when the specific node is a UE.

In order to transmit an uplink signal, a scrambling module 510 of the UE may scramble the transmission signal using a UE-specific scrambling signal. The scrambled signal is input to a modulation mapper 520 and is then modulated into a complex symbol through Binary Phase-Shift Keying (BPSK), Quadrature Phase Shift Keying (QPSK), or Quadrature Amplitude Modulation (16 QAM) according to the type of the transmission signal and/or channel state. The modulated complex symbol may be processed by a transform precoder 530 and may then be input to a resource element mapper 540. The resource element mapper 540 may then map the complex symbol to a time-frequency resource element which is to be used for actual transmission. Such a processed signal may then be transmitted to the eNode B through an antenna via an SC-FDMA signal generator 550.

Figure 6:
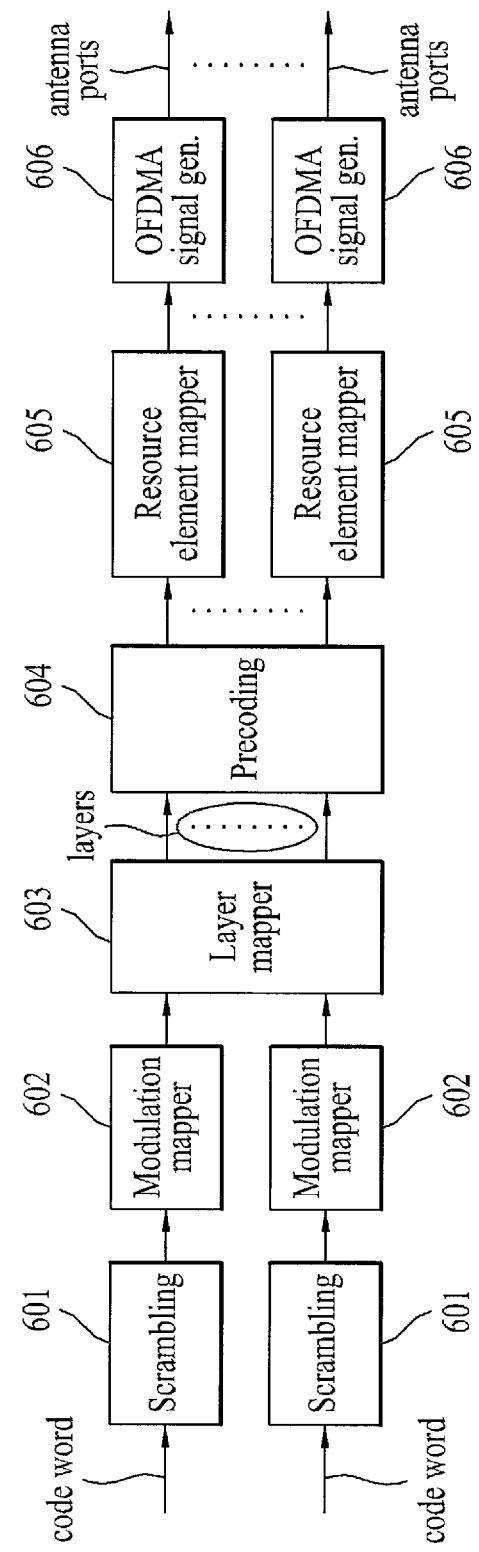
FIG. 6 illustrates a signal processing procedure for a specific node in a wireless network to transmit a downlink signal when the specific node is an eNode B.

FIG. 6 illustrates a signal processing procedure for a specific node in a wireless network to transmit a downlink signal when the specific node is an eNode B.

As shown in FIG. 6, an eNode B may transmit at least one codeword in downlink in a 3GPP LTE system which is an exemplary mobile communication system. Accordingly, the at least one codeword may be processed into a complex symbol through a scrambling module 601 and a modulation mapper 602 as in the case of uplink of FIG. 5. Then, the complex symbol may be mapped to a plurality of layers and each layer may then be multiplied by a specific precoding matrix selected according to channel state by a precoding module 604 and may then be allocated to a corresponding transmission antenna. Such a processed transmission signal of each antenna may be mapped to a time-frequency resource element which is to be used for transmission by a resource element mapper 605 and may then be transmitted through the corresponding antenna via an OFDM signal generator 606.

The present invention considers a method in which each node transmits a signal after precoding the signal using a Vector Perturbation (VP) scheme and a method in which each node transmits a signal after precoding the signal using a Zero-Forcing Dirty Paper Coding (ZF-DPC) scheme. The following description will be given assuming that the wireless network is a two-way-RN wireless network in which node 1, node 2, and an RN are present as shown in FIG. 1.

Node 1 and node 2 may simultaneously transmit signals to the RN. Here, the signals simultaneously that the RN has received from node 1 and node 2 may be represented by the following Expression 1.

$$y_R = H_1\sqrt{P}x_1 + H_2\sqrt{P}x_2 + z_R \quad \text{[Expression 1]}$$

Here, $H_1$, $H_2$ denote channel information indicating Multi-Input Multi-Output (MIMO) channel coefficients of channels from nodes 1 and 2 to the RN, P denotes transmission power of each node, and $z_R$ denotes noise.

When node 1 and node 2 transmit signals with different transmission powers $P_1$ and $P_2$, scaling may be performed such that the power difference is reflected in $H_1$, $H_2$.

First Embodiment

Where Vector Perturbation (VP) is Applied

The following is a description of a first embodiment of the present invention wherein each node applies precoding using a Vector Perturbation (VP) scheme when transmitting a signal to the RN. Here, let $s_i$ be a signal that each node i is to transmit after channel coding and modulation. Node i may apply precoding using the signal $s_i$ as shown in the following Expression 2 and transmit the signal to the RN.

$$x_i = H_i^*(H_iH_i^* + \alpha I)^{-1}(s_i + \tau_i l_i)/\sqrt{g_i} \quad \text{[Expression 2]}$$

Here, $H_i$ denotes channel matrix information of each node i, * denotes Hermitian, $\alpha$ denotes an appropriate constant, and I denotes an identity matrix. $l_i = [l_{i1}\, l_{i2} \ldots l_{iK}]^T$ denotes a lattice of a signal that each node transmits to the RN through each antenna, each element of the lattice is given by $l_{i,k} \in \{l_I + jl_Q | l_I, l_Q \in A\}$, and $g_i$ denotes a factor for normalizing the magnitude of the transmission signal $x_i$. Here, K denotes the number of transmission antennas of node i.

A signal that each node i transmits to the RN through each antenna is generated by a lattice such that the vector $l_i$ forms the lattice. The vector $l_i$ is a lattice of signals that each node transmits through antennas and may be calculated as an optimization solution of an equation expressed as the following Expression 3. That is, the following Expression 3 shows an equation for calculating lattice $l_i$ which minimizes the transmission power of a signal transmitted by each node.

$$l_i = \underset{l_i' \in \Lambda}{\arg\min} |H_i^*(H_iH_i^* + \alpha I)^{-1}(s_i + \tau_i l_i')|^2 \quad \text{[Expression 3]}$$

Here, $\tau_i$ denotes the size of the lattice. In addition, as described above with reference to Expression 2, $H_i$ denotes channel matrix information of each node i, * denotes Hermitian, $\alpha$ denotes an appropriate constant, and I denotes an identity matrix.

The following Expression 4 expresses $g_i$ which is a factor for normalizing the magnitude of a signal $x_i$ that each node transmits.

$$g_i = E[|H_i^*(H_iH_i^* + \alpha I)^{-1}(s_i + \tau_i l_i)|^2] \quad \text{[Expression 4]}$$

Here, E denotes average, $H_i$ denotes channel matrix information of each node i, * denotes Hermitian, $\alpha$ denotes an appropriate constant, I denotes an identity matrix, and $\tau_i$ denotes the initialized basic lattice size (or lattice size value) of a transmission signal. As shown in the following Expression 4, $g_i$ denotes the average of transmission power of each node i as a factor for normalizing the magnitude of the transmission signal $x_i$.

The RN may calculate the values of $\tau_i$ and $g_i$ and may notify each node i of the calculated values of $\tau_i$ and $g_i$. The RN calculates $\tau_i$ and $g_i$ through the following procedure.

Figure 7:
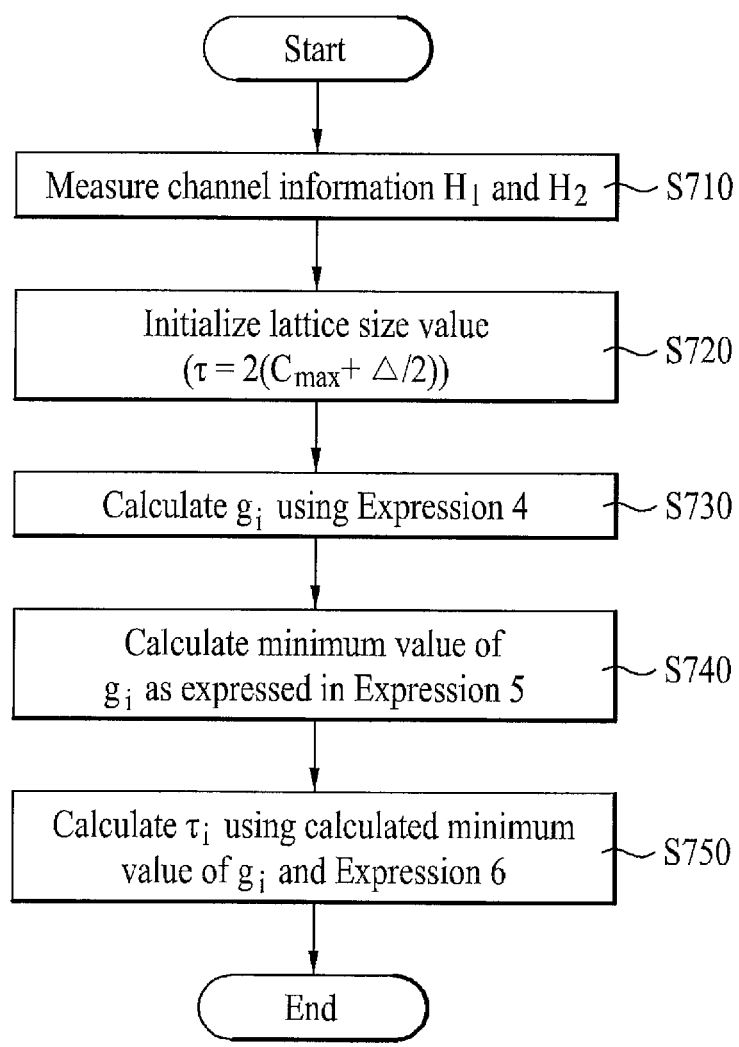
FIG. 7 is a flowchart illustrating a procedure of a preferred embodiment of a method for calculating $\tau_i$ and $g_i$ using a signal received from each node.

FIG. 7 is a flowchart illustrating a procedure of a preferred embodiment of a method for calculating $\tau_i$ and $g_i$ using a signal received from each node.

Procedures of the preferred embodiment of the method for calculating $\tau_i$ and $g_i$, which are described below with reference to FIG. 7, may be performed by at least one processor in the RN.

As shown in FIG. 7, first, the RN measures channel information $H_1$, $H_2$ of node 1 and node 2 using signals simultaneously received from node 1 and node 2 (S710). Then, the RN initializes the lattice size of each signal as the basic lattice size $\tau=2(c_{max}+\Delta/2)$ (i.e., $\tau_1=\tau_2=\tau$) (S720). Here, $c_{max}$ denotes the maximum coordinate value in the signal constellation and $\Delta$ denotes the minimum distance between adjacent signals.

Then, the RN may calculate $g_i$ from Expression 4 using the basic lattice size $\tau=2(c_{max}+\Delta/2)$ (S730). The RN may then obtain the minimum value of $g_i$ obtained in this manner (S740). The minimum value of $g_i$ may be expressed as shown in the following Expression 5.

$$g_{min} = \min_i g_i \quad \text{[Expression 5]}$$

When $$g_{min} = \min_i g_i,$$

the RN may recalculate $\tau_i$ as expressed in the following Expression 6.

$$\tau_i = \tau \sqrt{g_i/g_{min}} \quad \text{[Expression 6]}$$

In Expression 6, $\tau=2(c_{max}+\Delta/2)$. In addition, as described above, $c_{max}$ denotes the maximum coordinate value in the signal constellation and $\Delta$ denotes the minimum distance between adjacent signals.

The RN may recalculate $g_i$ by substituting the recalculated $\tau_i$ into the above Expression 4 using Expression 6. In this manner, the RN may calculate the values of $\tau_i$ and $g_i$ which satisfy Expressions 3 to 6. The RN may transmit $\tau_i$ and $g_i$ calculated through the procedure as shown in FIG. 7 to the respective nodes (i.e., the RN may notify node 1 of $\tau_1$ and $g_1$ and notify node 2 of $\tau_2$ and $g_2$)

When each node i transmits the signal $x_i$ ($x_i = H_i^*(H_iH_i^* + \alpha I)^{-1}(s_i + \tau_i l_i)/\sqrt{g_i}$) as shown in Expression 2 to the RN, the RN may receive the signal as shown in Expression 1 ($y_R = H_1 \sqrt{P}x_1 + H_2\sqrt{P}x_2 + z_R$). The RN decodes the received signals. Here, the RN may individually decode each of the signals transmitted by the nodes and may also decode a signal (or message) into which the signals (or messages) of the nodes have been combined (for example, a signal obtained through bitwise XOR of messages sent by the nodes).

In the case in which the RN individually decodes the two signals (or messages) received from the nodes, the RN combines the two signals (or messages) (through a bitwise XOR operation). Therefore, in both cases, the RN transmits the combined signal (or message). Each node may finally detect the signal (or message) transmitted by the counterpart node by removing the signal (or message) that the node has originally transmitted after decoding the signal (or message) received from the RN.

Second Embodiment

Where Zero-Forcing Dirty Paper Coding (ZF-DPC) is Applied

Each node may apply precoding using the Zero-Forcing Dirty Paper Coding (ZF-DPC) scheme when transmitting a signal to the RN according to a second embodiment of the present invention. Let $s_i$ be a signal that each node i is to transmit after channel coding and modulation. In addition, let $H_i$, i=1,2 be channel information of each node i. The channel information of each node i may be QR-decomposed as shown in the following Expression 7.

$$H_i = R_i Q_i \quad \text{[Expression 7]}$$

Here, $R_i$ is a lower triangular matrix (i.e., a matrix $R_i$ whose elements above diagonal elements are all 0) and $Q_i$ is a unitary matrix.

A signal transmitted from each node i to the RN is $Q_i^H x_i$ which is obtained by multiplying the signal $x_i$ by $Q_i^H$. Here, let $s_i$ be a signal that each node i is to transmit after channel coding and modulation. In addition, let $x_i = [x_1^{(i)} \; x_2^{(i)} \; \ldots \; x_K^{(i)}]^T$ be a signal that each node i transmits to the RN. Elements of $x_i = [x_1^{(i)} \; x_2^{(i)} \; \ldots \; x_K^{(i)}]^T$ (where i denotes node index and k denotes antenna index) are obtained through the following Expression 8.

$$x_1^{(i)} = s_1^{(i)}$$

$$x_k^{(i)} = s_k^{(i)} - \sum_{j=1}^{k-1} \frac{r_{kj}^{(i)}}{r_{kk}^{(i)}} x_j^{(i)} + p_k^{(i)} \quad \text{[Expression 8]}$$

Here, $r_{kj}^{(i)}$ denotes an element of row k and column j. In addition, $p_k^{(i)}$ denotes a lattice point which node i uses to transmit the kth signal and which is determined to be $p_k^{(i)} \in \{\tau_K^{(i)}(p_1+jp_Q)|p_1,p_Q \in A\}$ (where A denotes a set of integers) which minimizes transmission power $|x_k^{(i)}|^2$ of the signal.

Here, $\tau_k^{(i)}$ is a scaling factor representing the lattice size of the transmission signal. The RN may calculate $\tau_k^{(i)}$ which indicates the lattice used to transmit the kth signal and may notify each node i of the calculated $\tau_k^{(i)}$.

Figure 8:
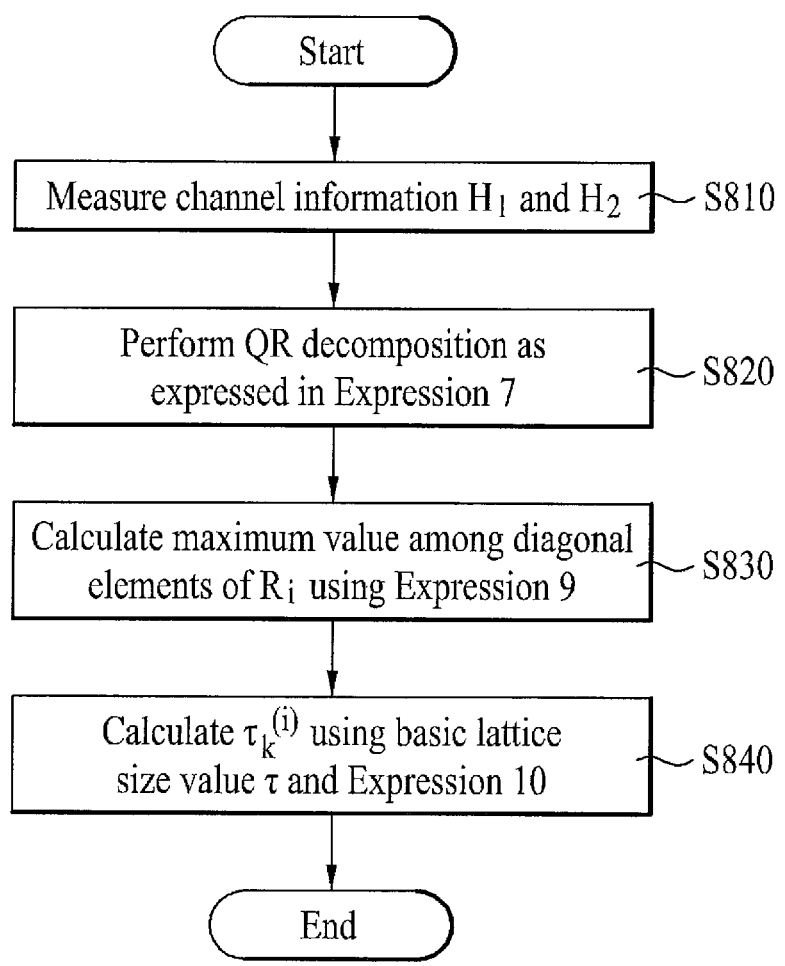
FIG. 8 is a flowchart illustrating a procedure of a preferred embodiment of a method for calculating $\tau_i$ using a signal received from each node.

FIG. 8 is a flowchart illustrating a procedure of a preferred embodiment of a method for calculating $\tau_i$ using a signal received from each node.

Procedures of the preferred embodiment of the method for calculating $\tau_i$, which are described below with reference to FIG. 8, may be performed by at least one processor in the RN.

As shown in FIG. 8, the RN measures channel information $H_1$, $H_2$ based on signals received from the nodes (i.e., node 1 and node 2) (S810). Thereafter, the RN performs QR decomposition on the channel information $H_1$, $H_2$ of nodes 1 and 2 as shown in Expression 7. The RN then calculates the largest value among diagonal elements of the decomposed $R_i$ as shown in Expression 7 (S830). The following Expression 9 expresses the largest value among the diagonal elements of the decomposed $R_i$.

$$r_{kk}^{max} = \max_i r_{kk}^{(i)} \quad \text{[Expression 9]}$$

Here, $r_{kj}^{(i)}$ denotes an element of row k and column j.

Assuming that the basic lattice size is $\tau=2(c_{max}+\Delta/2)$, the RN may calculate $\tau_k^{(i)}$ which indicates the lattice using the following Expression 10 (S840).

$$\tau_k^{(i)} = \tau r_{kk}^{max}/r_{kk}^{(i)} \quad \text{[Expression 10]}$$

The RN notifies node 1 and node 2 of $\tau_k^{(i)}$ obtained through steps S810 to S840. The RN may notify each of the nodes (i.e., nodes 1 and 2) of such $\tau_k^{(i)}$ information at regular intervals.

When each node calculates $x_i$ as shown in the above Expression 8 and transmits $Q_i^H x_i$ to the RN, the RN decodes $Q_i^H x_i$. Here, the RN may individually decode each of the signals (or messages) transmitted from the nodes or may decode a signal (or message) into which the signals (or messages) of the nodes have been combined (for example, a signal (or message) obtained through bitwise XOR of messages sent by the nodes). In the case in which the RN individually decodes the two signals (or messages) received from the nodes, the RN combines the two signals (or messages) (through bitwise XOR). Therefore, in both cases, the RN transmits the combined signal (or message) to each of the nodes. Each node finally detects the signal (or message) transmitted by the counterpart node by removing the signal (or message) that the node has originally transmitted after decoding the signal (or message) received from the RN.

Figure 9:
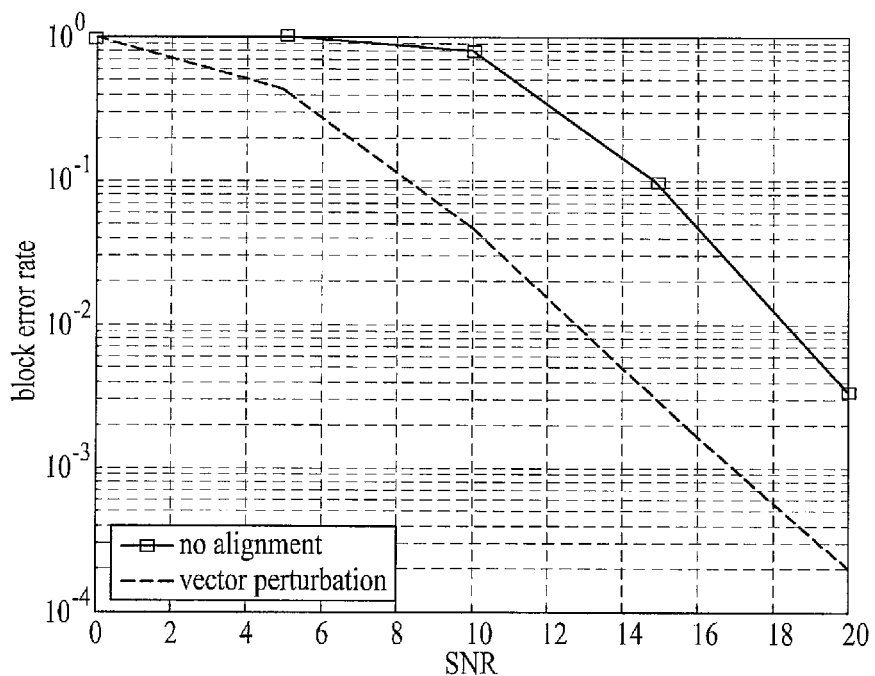
FIG. 9 shows block error rates (BERs) obtained through simulation when the number of antennas of each node and the number of antennas of the RN are 2 and 3.
Figure 9:
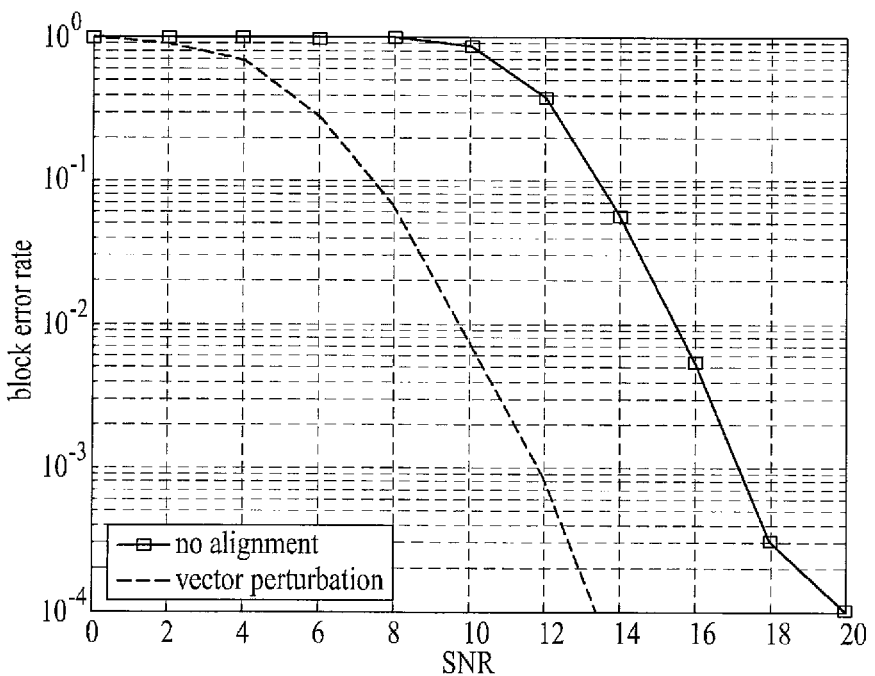

FIG. 9 shows block error rates (BERs) obtained through simulation when the number of antennas of each node and the number of antennas of the RN are 2 and 3.

That is, FIG. 9(a) shows a simulation result when the number of antennas is 2 and FIG. 9(b) shows a simulation result when the number of antennas is 3.

Specifically, the simulation results of FIGS. 9(a) and 9(b) are simulation results obtained when each node applies precoding using Vector Perturbation (VP) when transmitting a signal to the RN according to the first embodiment of the present invention in the case in which the number of antennas of each node and the number of antennas of the RN are 2 and in the case in which the number of antennas of each node and the number of antennas of the RN are 3, respectively.

Rayleigh fading is a phenomenon in which direct waves or the like do not satisfactorily arrive at the receiving side due to an obstacle such as a building but instead reflected waves mostly arrive at the receiving side via various paths and are then combined such that the intensity of the resulting signal rapidly fluctuates, causing fading. Rayleigh fading often occurs in a narrow band within 200 kHz and the resulting signal rapidly fluctuates in a short period, exerting a great influence upon mobile communication such as cellular communication.

In the simulation shown in FIG. 9, a Quadrature Phase Shift Keying (QPSK) modulation scheme is used in a Rayleigh fading channel and a convolutional code of ½ rate is used as a channel code. The size of one block is 128. In FIG. 9, "no alignment" indicates that the transmitting side transmits a signal without performing precoding such as ZF-DPC or vector perturbation.

From FIGS. 9(a) and 9(b), it can be seen that, for example, when a signal is transmitted after performing precoding using Vector Perturbation (VP) according to the first embodiment of the present invention, it is possible to obtain a Signal to Noise Ratio (SNR) of 5 to 6 dB or higher for the same block error rate, compared to the conventional method.

As described above, in a two-way wireless RN network which uses multiple antennas, the RN simultaneously detects signals received from both nodes and transmits the signals to the nodes, thereby achieving an advantage in that transmission time is reduced.

Figure 10:
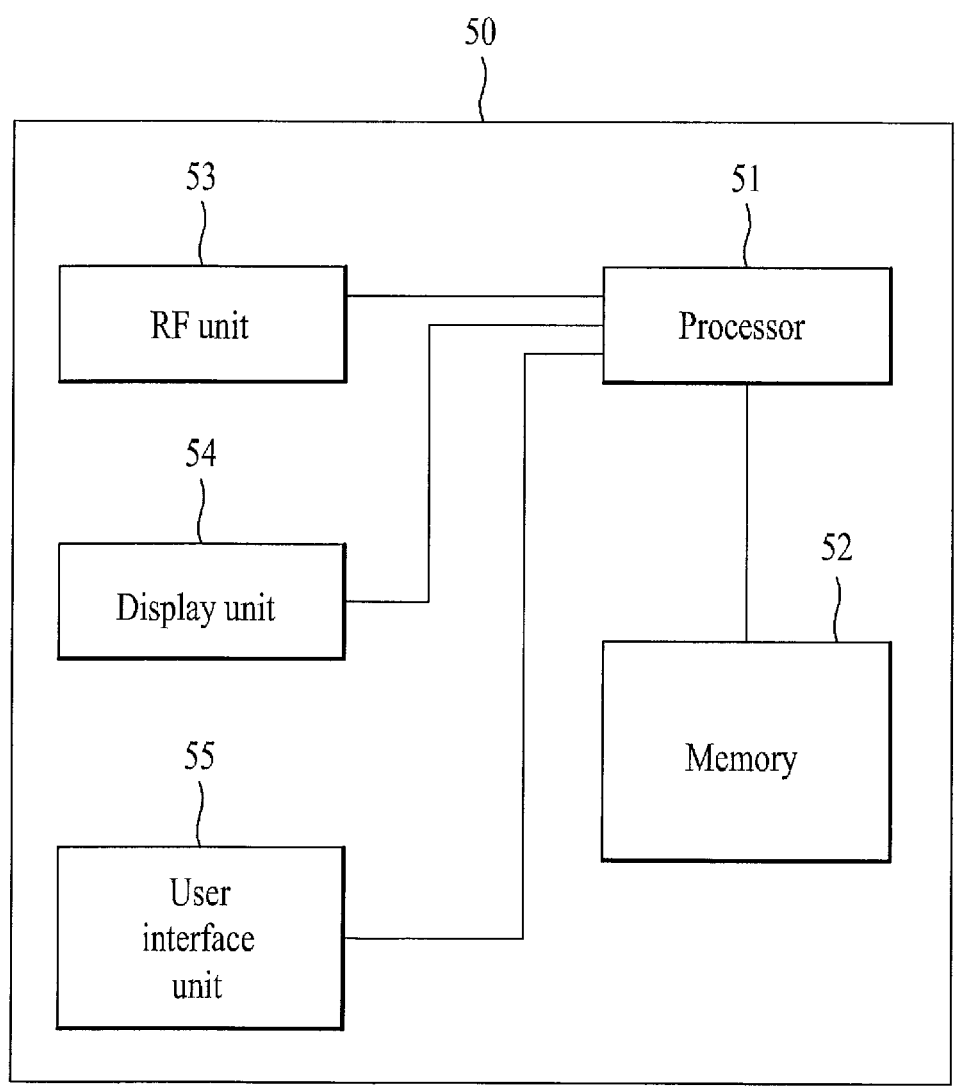
FIG. 10 illustrates components of an apparatus 50 according to the present invention.

FIG. 10 illustrates components of an apparatus 50 according to the present invention.

As shown in FIG. 10, the apparatus 50 may be a UE, an eNode B, or an RN. The apparatus 50 includes a processor 51, a memory 52, a radio frequency (RF) unit 53, a display unit 54, and a user interface unit 55.

Radio interface protocol layers are implemented in the processor 51. The processor 51 provides a control plane and a user plane. Functions of the layers may be implemented in the processor 51. The memory 52 is connected to the processor 51 to store an operating system, applications, and general files.

The display unit 54 may display various information and may use a well-known element such as a liquid crystal display (LCD) or an organic light emitting diode (OLED).

The user interface unit 55 may be constructed of a combination of well-known user interfaces such as a keypad and a touchscreen.

The RF unit 53 may be connected to the processor 51 to transmit and receive radio signals. The RF unit 53 may be divided into a transmission module (not shown) and a reception module (not shown).

Radio interface protocol layers between the UE and the network may be classified into a first layer (L1), a second layer (L2), and a third layer (L3) based on the lower three layers of the open system interconnection (OSI) model well-known in communication systems. A physical layer which belongs to the first layer provides information transmission services through a physical channel. A radio resource control (RRC) layer which belongs to the third layer provides control wireless resources between the UE and the network. The UE and the network exchange RRC messages through the RRC layer.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case in which the present invention is implemented by hardware, an embodiment of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case in which the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

The invention claimed is:

1. A method for relaying signals simultaneously received from a plurality of nodes in a mobile communication system, the method comprising:
   simultaneously receiving signals from a plurality of nodes;
   calculating a lattice size value of a signal that each of the plurality of nodes is to transmit through each antenna and a normalization factor value for normalizing a magnitude of the signal that each of the plurality of nodes is to transmit based on the signals simultaneously received from the plurality of nodes; and
   transmitting, the calculated lattice size value and normalization factor value, to each of the plurality of nodes.

2. The method according to claim 1, wherein calculating the lattice size value and the normalization factor value further comprising:
   calculating an initialized first basic lattice size value as the lattice size value of the signal according to a predefined rule;
   calculating, for each of the nodes, a first normalization factor value for normalizing magnitudes of signals simultaneously received from the nodes and a minimum normalization factor value corresponding to a minimum of the first normalization factor value using the first basic lattice size value and channel information of each of the nodes;
   calculating a second lattice size value of each of the nodes using the first normalization factor value, the minimum normalization factor value, and the first basic lattice size value calculated for each of the nodes; and
   calculating a second normalization factor value using the second lattice size value and channel information of each of the nodes,
   wherein the lattice size value and the normalization factor value transmitted to each of the nodes are the second lattice size value and the second normalization factor value.

3. The method according to claim 2, wherein calculating the initialized first basic lattice size value includes calculating the first basic lattice size value according to the preset rule using the following Expression A:

$$\tau = 2(c_{max} + \Delta/2),$$ [Expression A]

where $c_{max}$ denotes a maximum coordinate value in signal constellation and $\Delta$ denotes a minimum distance between adjacent signals.

4. The method according to claim 3, wherein calculating the first normalization factor value includes the normalization factor value using the following Expression B:

$$g_i = E[|H_i^*(H_iH_i^* + \alpha I)^{-1}(s_i + \tau_i l_i)|^2],$$ [Expression B]

where E denotes average, * denotes Hermitian, $\alpha$ denotes an appropriate constant, $H_i$ denotes a channel matrix which is channel information of each of the nodes i, I denotes an identity matrix, $s_i$ denotes a signal that each of the nodes i is to transmit after channel coding and modulation, $\tau_i$ denotes an initialized basic lattice size value of each of the nodes, and vector $l_i$ denotes a lattice which minimizes transmission power of the signal that each of the nodes transmits through each antenna.

5. The method according to claim 3, wherein the second basic lattice size value is calculated using the following Expression C:

$$\tau_i = \tau \sqrt{g_i/g_{min}},$$ [Expression C]

where $\tau$ denotes the initialized first basic lattice size value, $g_i$ indicates an average of transmission power of each of the nodes i as a factor for normalizing the magnitude of a signal $x_i$ received from each of the nodes, and $g_{min}$ denotes a minimum value of $g_i$.

6. The method according to claim 3, wherein the signals simultaneously received from the nodes are expressed as in the following Expression D:

$$x_i = H_i^*(H_iH_i^* + \alpha I)^{-1}(s_i + \tau_i l_i)/\sqrt{g_i},$$ [Expression D]

where $\alpha$ denotes a constant, $H_i$ denotes a channel matrix which is channel information of each of the nodes i, I denotes an identity matrix, * denotes Hermitian, $g_i$ denotes a factor for normalizing a magnitude of a transmission signal $x_i$, $\tau_i$ denotes a scaling factor for determining a lattice size value, and $l_i$ denotes a lattice of a signal that each of the nodes transmits through each antenna.

7. The method according to claim 4, wherein the vector $l_i$ expressed as in the following Expression E:

$$l_i = \underset{l_i' \in \Lambda}{\operatorname{argmin}} |H_i^*(H_iH_i^* + \alpha I)^{-1}(s_i + \tau_i l_i')|^2.$$ [Expression E]

8. A method for transmitting a signal from a node in a mobile communication system, the method comprising:
   receiving, from a relay, a lattice size value of a signal that is to be transmitted through each antenna and a normalization factor value for normalizing a magnitude of a signal that the node is to transmit;
   performing precoding on a channel-coded signal using the received lattice size value and normalization factor value; and
   transmitting the precoded signal to the relay through each antenna.

9. The method according to claim 8, wherein the precoding is applied as expressed in the following Expression F:

$$x_i = H_i^*(H_iH_i^* + \alpha I)^{-1}(s_i + \tau_i l_i)/\sqrt{g_i}$$ [Expression F]

where $x_i$ denotes a signal transmitted to the relay, $H_i$ denotes a channel matrix which is channel information of each of the nodes i, * denotes Hermitian, $\alpha$ denotes a constant, I denotes an identity matrix, $g_i$ is a factor for normalizing, $\tau_i$ denotes a lattice size value of a signal, vector $l_i$ denotes a lattice which minimizes transmission power of a signal that each of the nodes transmits through each antenna.

10. A relay for relaying signals simultaneously received from a plurality of nodes in a mobile communication system, the relay comprising:
   a reception module configured to simultaneously receiving signals from a plurality of nodes;
   a processor configured to calculating a lattice size value of a signal that each of the plurality of nodes is to transmit through each antenna and a normalization factor value for normalizing a magnitude of the signal that each of the plurality of nodes is to transmit based on the signals simultaneously received from the plurality of nodes; and
   a transmission module configured to transmitting the calculated lattice size value and normalization factor value to each of the plurality of nodes.

11. The relay according to claim 10, wherein the processor includes:
   a first processor for calculating an initialized first basic lattice size value as the lattice size value of the signal according to a predefined rule;
   a second processor for calculating, for each of the nodes, a first normalization factor value for normalizing magnitudes of signals simultaneously received from the nodes and a minimum normalization factor value corresponding to a minimum of the first normalization factor value using the first basic lattice size value and channel information of each of the nodes;
   a third processor for calculating a second lattice size value of each of the nodes using the first normalization factor value, the minimum normalization factor value, and the first basic lattice size calculated for each of the nodes; and
   a fourth processor for calculating a second normalization factor value using the second lattice size value and channel information of each of the nodes,
   wherein the lattice size value and the normalization factor value transmitted from the transmission module to each of the nodes are the second lattice size value and the second normalization factor value.

12. The relay according to claim 11, wherein the first processor calculates an initialized first basic lattice size value according to the preset rule using the following Expression A:

$$\tau = 2(c_{max} + \Delta/2),\quad\quad \text{[Expression A]}$$

where $c_{max}$ denotes a maximum coordinate value in signal constellation and $\Delta$ denotes a minimum distance between adjacent signals.

13. The relay according to claim 12, wherein the second processor calculates the first normalization factor value using the following Expression B:

$$g_i = E[|H_i^*(H_i H_i^* + \alpha I)^{-1}(s_i + \tau_i l_i)|^2],\quad\quad \text{[Expression B]}$$

where E denotes average, * denotes Hermitian, $\alpha$ denotes an appropriate constant, $H_i$ denotes a channel matrix which is channel information of each of the nodes i, I denotes an identity matrix, $s_i$ a signal that each of the nodes i is to transmit after channel coding and modulation, $\tau_i$ denotes an initialized basic lattice size value of each of the nodes, and vector $l_i$ denotes a lattice which minimizes transmission power of the signal that each of the nodes transmits through each antenna.

14. The relay according to claim 12, wherein the third processor calculates the second basic lattice size value using the following Expression C:

$$\tau_i = \tau\sqrt{g_i/g_{min}}\quad\quad \text{[Expression C]}$$

where $\tau$ denotes the initialized first basic lattice size value, $g_i$ indicates an average of transmission power of each of the nodes i as a factor for normalizing the magnitude of a signal $X_i$ received from each of the nodes, and $g_{min}$ denotes a minimum value of $g_i$.

15. The relay according to claim 12, wherein the signals simultaneously received from the nodes by the reception module are expressed as in the following Expression D:

$$x_i = H_i^*(H_i H_i^* + \alpha I)^{-1}(s_i + \tau_i l_i)/\sqrt{g_i},\quad\quad \text{[Expression D]}$$

where $\alpha$ denotes a constant, $H_i$ denotes a channel matrix which is channel information of each of the nodes i, I denotes an identity matrix, * denotes Hermitian, $g_i$ denotes a factor for normalizing a magnitude of a transmission signal $x_i$, $\tau_i$ denotes a scaling factor for determining a lattice size value, and $l_i$ denotes a lattice of a signal that each of the nodes transmits through each antenna.

16. The relay according to claim 13, wherein the vector $l_i$ is expressed as in the following Expression E:

$$l_i = \operatorname*{argmin}_{l_i' \in \Lambda} |H_i^*(H_i H_i^* + \alpha I)^{-1}(s_i + \tau_i l_i')|^2.\quad\quad \text{[Expression E]}$$

17. A node for transmitting a signal in a mobile communication system, the node comprising:
   a reception module configured to receive, from a relay, a lattice size value of a signal that is to be transmitted through each antenna and a normalization factor value for normalizing a magnitude of a signal that the node is to transmit;
   a processor configured to perform precoding on a channel-coded signal using the received lattice size value and normalization factor value; and
   a transmission module configured to transmit the precoded signal to the relay through each antenna.

18. The node according to claim 17, wherein the processor performs the precoding using the following Expression F:

$$x_i = H_i^*(H_i H_i^* + \alpha I)^{-1}(s_i + \tau_i l_i)/\sqrt{g_i},\quad\quad \text{[Expression F]}$$

where $x_i$ denotes a signal transmitted to the relay, $H_i$ denotes a channel matrix which is channel information of each of the nodes i, * denotes Hermitian, $\alpha$ denotes a constant, I denotes an identity matrix, $g_i$ is a factor for normalizing, $\tau_i$ denotes a lattice size value of a signal, vector $l_i$ denotes a lattice which minimizes transmission power of a signal that each of the nodes transmits through each antenna.

* * * * *